(12) United States Patent
Baldwin

(10) Patent No.: US 6,689,953 B2
(45) Date of Patent: Feb. 10, 2004

(54) FLEXIBLE MAST/METER CAN CONNECTOR

(76) Inventor: Robert M. Baldwin, 607 Garland St., Excelsior Springs, MO (US) 64024

( * ) Notice: Subject to any disclaimer, the term of this patent is extended or adjusted under 35 U.S.C. 154(b) by 123 days.

(21) Appl. No.: 09/953,010

(22) Filed: Sep. 11, 2001

(65) Prior Publication Data

US 2003/0049977 A1 Mar. 13, 2003

(51) Int. Cl.[7] .................................................. H01J 15/00
(52) U.S. Cl. ........................................................ 174/50
(58) Field of Search ................................. 439/517, 165, 439/164, 210, 535; 174/38, 48, 60, 68.3, 71 R, 72 R, 37, 50, 65 R; 361/665, 659; 220/3.8, 3.5

(56) References Cited

U.S. PATENT DOCUMENTS

| | | | | |
|---|---|---|---|---|
| 4,327,396 A | | 4/1982 | Schacht | |
| 4,861,942 A | * | 8/1989 | Moran, Jr. | 174/38 |
| 4,875,871 A | * | 10/1989 | Booty, Sr. et al. | 439/164 |
| 5,334,057 A | | 8/1994 | Blackwell | |
| 5,400,212 A | * | 3/1995 | Hanson | 361/665 |
| 5,663,525 A | | 9/1997 | Newman | |
| 5,817,980 A | * | 10/1998 | Kirma | 174/86 |

* cited by examiner

Primary Examiner—Jean F. Duverne
(74) Attorney, Agent, or Firm—Hovey Williams LLP

(57) ABSTRACT

A pivot adaptor couplable between an electrical meter and a service mast. The pivot adaptor includes a main body which is internally pivotable between a normal position and a yielded position without substantial inelastic deformation thereof. The body defines a cable-receiving channel extending therethrough and is configured to keep the channel at least substantially open when the body is in the normal and yielded positions.

31 Claims, 4 Drawing Sheets

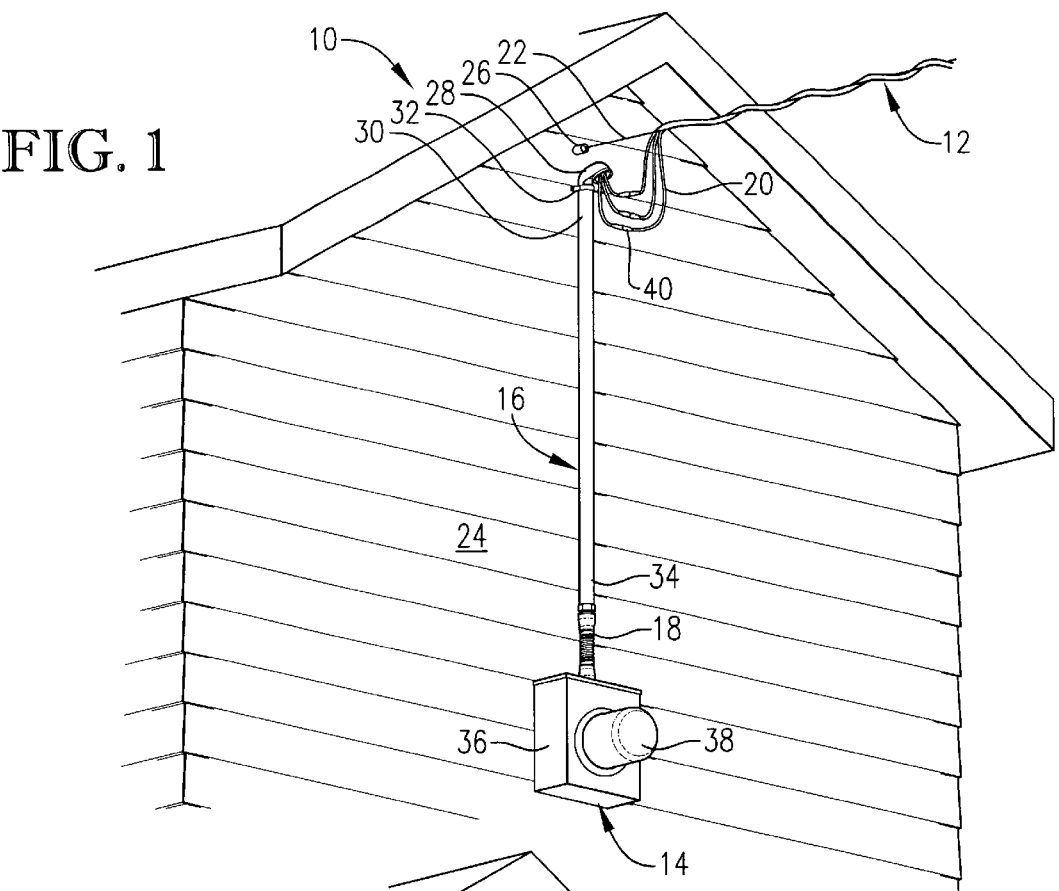
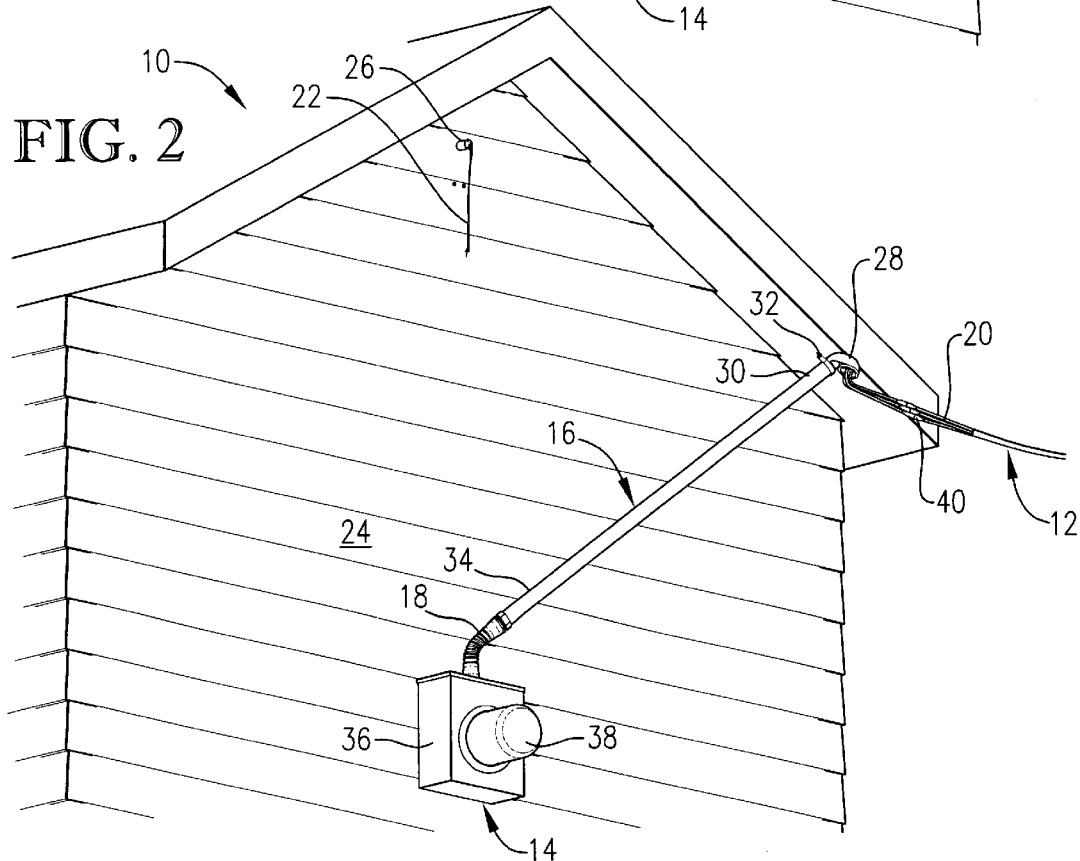

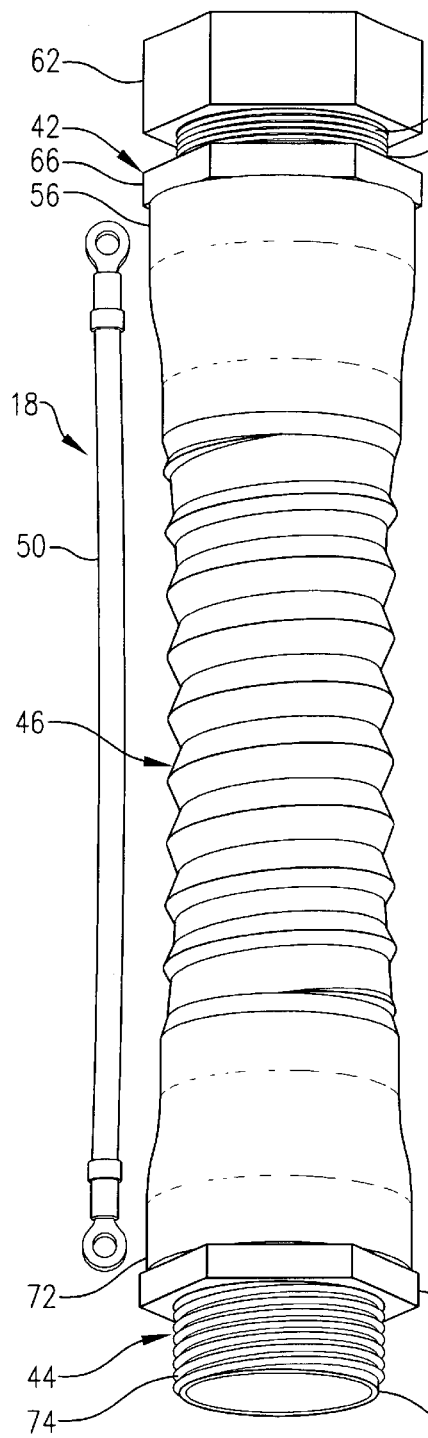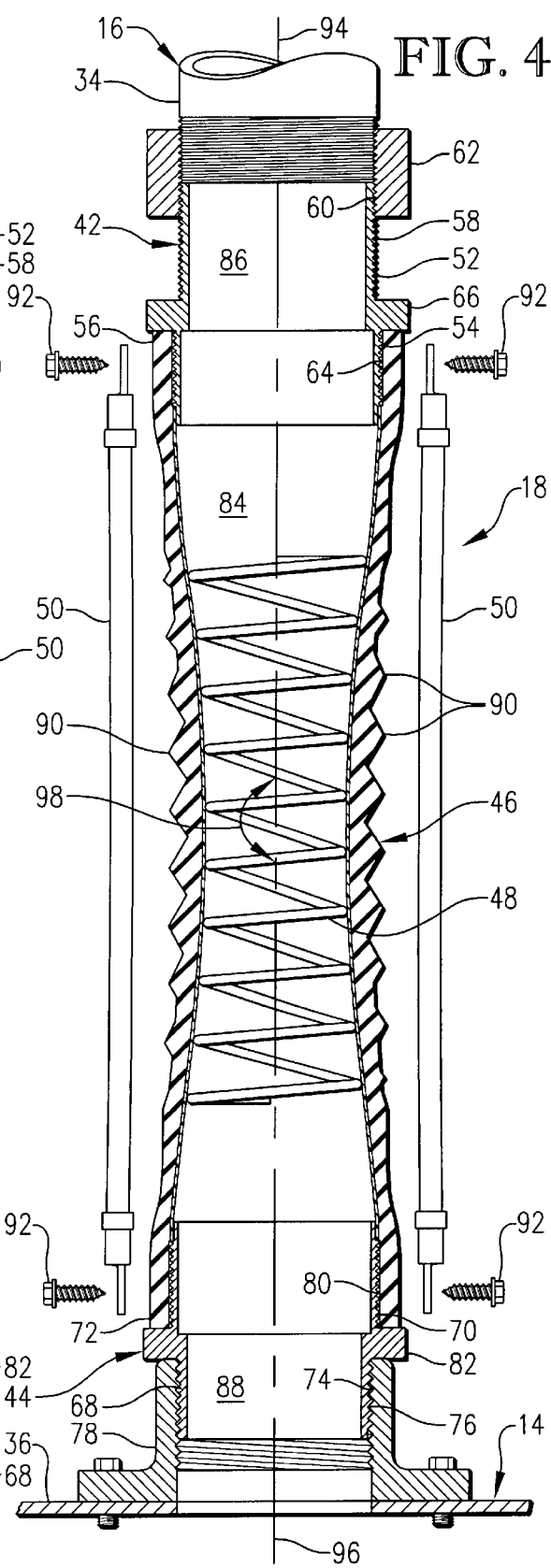

FLEXIBLE MAST/METER CAN CONNECTOR

BACKGROUND OF THE INVENTION

1. Field of the Invention

The present invention relates generally to systems for coupling an outdoor overhead electrical power line to an electrical meter. More specifically, the invention concerns an adaptor which connects a service mast to an electrical meter in a manner such that when the service mast is caused to pivot relative to the electrical meter, the mast and the meter are not structurally damaged and the electrical connection between the power line and the electrical meter is maintained.

2. Discussion of Prior Art

Those of ordinary skill in the electrical power industry will appreciate that conventional systems for coupling an outdoor overhead power line to an outdoor electrical meter typically comprise a substantially rigid, tubular service mast having a weatherhead coupled to its top end for receiving the power line and a threaded connector at its bottom end for rigidly coupling the mast to the electrical meter. The top end of the mast and the electrical meter are typically attached to a common external wall. In the event that the top end of the service mast becomes decoupled from the wall (e.g., if a tree limb falls on the power line), the service mast would pivot relative to the electrical meter, thereby causing (1) damage to the service mast, (2) damage to the electrical meter, and/or (3) damage to the electrical connection between the power line and the electrical meter. Such damage to the service mast or the electrical meter can be expensive and time consuming to repair. However, perhaps the most serious disadvantage of the existing systems for coupling an overhead power line to an electrical meter is the increased risk of an electrical fire caused by damage to the connection between the power line and the electrical meter when the service mast swings away from the support wall.

OBJECTS AND SUMMARY OF THE INVENTION

Responsive to these and other problems, an important object of the present invention is to provide a method and apparatus for preventing damage to a service mast, an electrical meter, and/or an electrical connection between a power line and an electrical meter when the service mast becomes decoupled from a supporting wall.

In accordance with these and other objects evident from the following description of the preferred embodiment, in one embodiment of the present invention, a pivot adaptor couplable between an electrical meter and a substantially rigid elongated service mast is provided. The service mast includes a first end attached to a relatively fixed structure and presenting an opening for receiving an electrical cable. The electrical cable extends through the mast and is electrically coupled to the meter. The pivot adaptor comprises a first connector couplable to a second end of the mast, a second connector couplable to the meter, and a main body coupled to and extending between the connectors. The main body allows movement of the connectors relative to one another between a normal position and a yielded position without substantial inelastic deformation of the body. The body at least partly defines a cable-receiving channel extending at least partly therethrough. The body is configured to keep the channel at least substantially open when the body is in the normal and yielded positions.

In accordance with another embodiment of the invention, a flexible adaptor couplable between an electrical meter and a substantially rigid elongated service mast is provided. The service mast includes a first end attached to a relatively fixed structure and presenting an opening for receiving an electrical cable. The electrical cable extends through the mast and is electrically coupled to the electrical meter. The flexible adaptor comprises a first connector couplable to a second end of the mast, a second connector couplable to the meter, a flexible body couplable to and extending between the connectors, and a wall support member coupled to the flexible body. The flexible body defines a cable-receiving channel extending therethrough. The body is bendable between a normal position and a flexed position without substantial inelastic deformation thereof. The wall support member is composed of a material having a greater rigidity than the body. The support member is operable to keep the channel at least substantially open when the body is in the flexed position.

In still another embodiment of the invention, a hinged adaptor couplable between an electrical meter and a substantially rigid elongated service mast is provided. A first end of the service mast is attached to a relatively fixed structure and presents an opening for receiving an electrical cable. The electrical cable extends through the mast and is electrically coupled to the meter. The hinged adaptor comprises a mast-side conduit, a meter-side conduit, a hinge coupling the conduits to one another when the conduits are in an unlocked position, and a friction lock coupling the conduits to one another when the conduits are in a locked position. The mast-side conduit is couplable to the second end of the mast and defines a first cable-receiving channel. The meter-side conduit is couplable to the meter and defines a second cable-receiving channel. The hinge provides pivotal movement of the conduits relative to one another when the conduits are in the unlocked position. The friction lock inhibits pivotal movement of the conduits relative to one another when the conduits are in a locked position. The friction lock is releasable without substantial destruction thereof when a sufficient lock-releasing force is applied to one of the conduits.

In yet another embodiment of the invention, an apparatus for associating an overhead powerline with a relatively fixed structure is provided. The apparatus comprises a substantially rigid elongated service mast, a substantially rigid base, and a pivot adaptor. The service mast presents a first mast end and a second mast end and defines a mast channel extending therebetween. The first mast end and the base are adapted to be coupled to the fixed structure. The pivot adaptor is coupled between the second mast end and the base and defines an adaptor channel extending therethrough. The adaptor allows for the mast to swing relative to the base without substantial inelastic deformation of the mast or the base.

In still a further embodiment of the present invention, an apparatus for associating an overhead powerline with a relatively fixed structure is provided. The apparatus comprises a substantially rigid elongated service mast, a substantially rigid base, and a pivot adaptor. The service mast presents a first mast end and a second mast end and defines a mast channel extending therebetween. The first mast end and the base are adapted to be coupled to the fixed structure. The pivot adaptor is coupled between the second mast end and the base and defines an adaptor channel extending therethrough. The pivot adaptor is internally pivotable without substantial inelastic deformation of the adaptor.

In yet still another embodiment of the present invention, a method of associating a service mast with an electrical meter is provided. The method comprises the steps of (a) coupling a first end of a pivot adaptor to the electrical meter; (b) coupling a second end of the pivot adaptor to the service mast; and (c) passing an electrical conduit through a channel of the pivot adaptor, said pivot adaptor providing for movement of the service mast relative to the electrical meter without substantial inelastic deformation of the service mast or the electrical meter.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is an elevation view of a system for associating an overhead power line and an electrical meter, with the service mast being coupled at its top end to a supporting wall;

FIG. 2 is an elevation view of the system for associating an overhead power line and an electrical meter, with the top end of the service mast being decoupled from the supporting wall;

FIG. 3 is a side view of a flexible adaptor for connecting a service mast to an electrical meter in accordance with one embodiment of the present invention;

FIG. 4 is a sectional side view of the flexible adaptor illustrated in FIG. 3, showing the internal structure of the adaptor as well as the manner in which the adaptor is coupled to the electrical meter;

DETAILED DESCRIPTION OF THE PREFERRED EMBODIMENTS

Figures 5, 6:
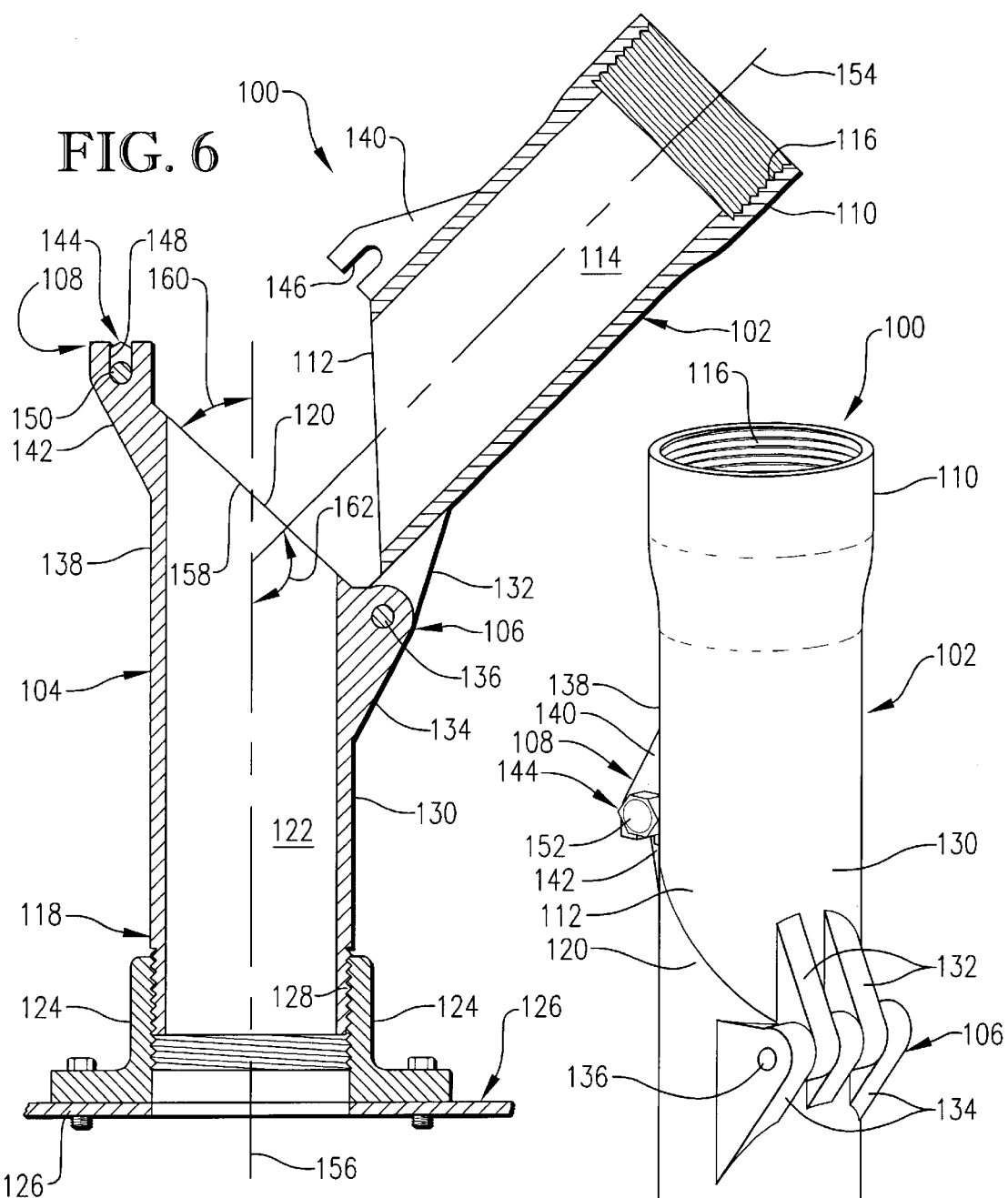
FIG. 5 is a side view of a hinged adaptor for connecting a service mast to an electrical meter in accordance with one embodiment of the present invention, showing the adaptor in a locked position.
FIG. 6 is a sectional side view of the hinged adaptor illustrated in FIG. 5, showing the adaptor in an unlocked position.

Referring initially to FIGS. 1 and 2, an outdoor electrical meter system 10 in accordance with one embodiment of the present invention is illustrated. System 10 generally comprises a powerline 12, an electrical meter 14, a service mast 16, and a pivot adaptor 18 for coupling service mast 16 to electrical meter 14.

Power line 12 is preferably a conventional, overhead, outdoor powerline for providing electrical power to commercial or residential structures. Powerline 12 typically includes a plurality of insulated electrical conductors 20 for carrying electrical power and a line support cable 22 for supporting powerline 12 as it is suspended between supporting structures. When powerline 12 is providing power to a commercial or residential structure, line support cable 22 is typically coupled to an external wall 24 of the structure via a cable anchor 26.

Conductors 20 are generally received in a weatherhead 28 coupled to an upper end 30 of service mast 16. Service mast 16 defines an axial channel extending therethrough for receiving conductors 20 and protecting conductors 20 from damage. Service mast 16 is typically composed of a substantially rigid material such as, for example, PVC, aluminum, or steel. Upper end 30 of service mast 16 is coupled to external wall 24 via a mast anchor 32.

Pivot adaptor 18 is coupled between a lower end 34 of service mast 16 and electrical meter 14. Electrical meter 14 generally comprises a meter housing 36 for protecting the internal components of meter 14 from the external environment and a translucent viewer 38 for allowing periodic reading of electrical usage. Meter housing 36 is typically coupled to the same support structure (e.g., external wall 24) to which cable anchor 26 and mast anchor 32 are coupled.

Pivot member 18 defines an internal channel which allows conductors 20 to pass therethrough from service mast 16 to meter 14 where conductors 20 form an electrical and physical connection with meter 14. Pivot member 18 is adapted to provide for pivotal movement of service mast 16 relative to meter 14 between a normal position in which upper end 30 of service mast 16 is coupled to wall 24 (as shown in FIG. 1) and a yielded position in which upper end 30 of service mast 16 is decoupled from wall 24 and is swung generally away from wall 24 (as shown in FIG. 2). The decoupling of service mast 16 from wall 24 can be caused by a number of events, perhaps the most common of which being a tree branch falling on powerline 12, causing line support cable 22 to become decoupled from wall 24.

As shown in FIG. 2, pivot adaptor 18 allows service mast 16 to pivot relative to electrical meter 14 without damage to (i.e., substantial inelastic deformation of) service mast 16 or electrical meter 16. Further, pivot adaptor 18 prevents the separation of mast 16 from meter 14, thereby preventing damage to the electrical connection between conductors 20 and meter 14. Preferably, pivot adaptor 18 is internally pivotable between the normal and yielded position without substantial inelastic deformation thereof. As used herein, the term "internally pivotable" shall mean that at least a portion of pivot adaptor 18 can be yielded to provide for pivotal movement of one end of pivot adaptor 18 relative to another end of pivot adaptor 18. Thus, because pivot adaptor 18 remains substantially undamaged when pivoted between the normal and yielded positions, service mast 16 can easily be reattached to wall 24 without requiring replacement of service mast 16, electrical meter 14, or pivot adaptor 18.

One or more releasable electrical conductors 40 can also be employed to prevent powerline 12 from pulling electrical meter 14 off of wall 24 when pivot adaptor 18 is in the yielded position (as shown in FIG. 2). Releasable connectors 40 are preferably interposed in conductors 20 of powerline 12 proximal weatherhead 28. When conductors 20 are subjected to a certain magnitude of tension (e.g., when line support cable 22 is not supporting powerline 12 as shown in FIG. 2) conductors 20 are released to thereby decouple powerline 12 from service mast 16. Connectors 20 are described in more detail below in with reference to FIG. 7.

Turning now to FIGS. 3 and 4, pivot adaptor 18 is illustrated as generally comprising a mast connector 42, a meter connector 44, a flexible body 46, a wall support member 48, and a pair of bonding cables 50.

Mast connector 42 presents a first end 52 couplable to lower end 34 of service mast 16 and a second end 54 couplable to an upper end 56 of body 46. First end 52 of mast connector 42 presents male threads 58 which mate with corresponding female threads 60 on a mast connector nut 62. Mast connector nut 62 is also threadable couplable to lower end 34 of service mast 16 to thereby attach mast connector 42 to service mast 16. Second end 54 of mast connector 42 present a plurality of ribs 64 which can form a force-fit connection with upper end 56 of body 46. A flange 66 of mast connector 42 separates first and second ends 52, 54 and prevents body 46 from sliding onto first end 52 of mast connector 42. A clamp (not shown) can be employed to exert an inward radial force around upper end 56 of body 46 to thereby more securely fasten mast connector 42 to body 46 via ribs 64.

Meter connector 44 presents a first end 68 couplable to electrical meter 14 and a second end 70 couplable to a lower end 72 of body 46. First end 68 of meter connector 44 present male threads 74 which mate with corresponding female threads 78 on a meter socket 78. Meter socket 78 couples meter connector 44 to meter housing 36. Second end 70 of meter connector 44 presents a plurality of ribs 80 which can form a force-fit connection with lower end 72 of body 46. A flange 82 of meter connector 44 separates first and second ends 68, 70 and prevents body 46 from sliding onto first end 68 of meter connector 44. As with mast connector 42, a clamp (not shown) can be used in conjunction with meter connector 44 to securely fasten meter connector 44 to body 46 via ribs 80. Mast and meter connectors 42, 44 are preferably formed of a substantially rigid material such as, for example, steel.

Flexible body 46 is formed of a flexible material which allows body 46 to bend internally without substantial inelastic deformation thereof. Body 46 defines an axial channel 84 extending therethrough between upper end 56 and lower end 72. Axial channel 84 of body 46 communicates with a mast connector channel 86 proximal upper end 56 and a meter connector channel 88 proximal lower end 72. Thus, a conductor-receiving passageway is formed through mast 16, mast connector 42, body 46, meter connector 44, meter socket 78, and meter housing 36. Body 46 is preferably formed of a tough, resilient, and flexible synthetic resin material. Body 46 can include a plurality of corrugations 90 operable to aid in keeping axial channel 84 at least substantially open while allowing for bending of body 46 between a normal position and a flexed (i.e., yielded) position. As used herein with reference to the channel through pivot adaptor 18, the term "open" shall mean that the minimum open cross-sectional area of the channel shall be sufficient to allow an electrical cable from a powerline to pass therethrough without pinching the cable.

Pivot adaptor 18 can further comprise a wall support member 48 disposed in axial channel 84 and operable to keep axial channel 84 at least substantially open when body 46 is in the flexed (i.e., yielded) position. Wall support member 48 is preferably composed of a material having a rigidity greater than that of body 46. Preferably, wall support member 48 is formed of a substantially rigid wire that is coiled into a generally spiral, spring-like configuration and contacts the interior wall of body 46 to thereby keep axial channel 84 at least substantially open when pivot adaptor 18 is in the normal and flexed (i.e., yielded) positions.

Mast connector channel 86 extends axially through mast connector 42 generally along a mast connector axis 94. Meter connector channel 88 extends axially through meter connector 44 generally along a meter connector axis 96. When pivot adaptor 18 is in the normal position, mast connector axis 94 and meter connector axis 96 are at least substantially parallel to one another, preferably at least substantially aligned with one another. However, when mast connector 42 and meter connector 44 are pivoted relative to one another out of the normal position and into the flexed (i.e., yielded) position, mast connector axis 94 and meter connector axis 96 define a pivot angle 98 therebetween, with pivot angle 98 being the minimum angle between axes 94 and 96 measured along the plane at least substantially cooperatively defined by mast connector axis 94 and meter connector axis 96.

The configuration of body 46 and wall support member 48 allow axial channel 84 to remain at least substantially open when pivot angle 98 is varied by more than about 30 degrees, more preferably more than about 60 degrees, and most preferably more than 90 degrees. When body 46 is in the normal position, pivot angle 98 is preferably greater than about 135 degrees, most preferably greater than 160 degrees. When body 46 is in the flexed (i.e., yielded) position, pivot angle 98 is preferably less than about 135 degrees, most preferably less than 90 degrees.

Bonding cables 50 are preferably coupled to and extend between mast connector 42 and meter connector 44. Metal screws 92 can be used to attach respective ends of bonding cables 50 to the mast and meter connectors 42, 44. Screws 92 and cables 50 are operable to electrically couple mast and meter connectors 42, 44 to thereby prevent the build up of electrical charge on the mast-side of pivot adaptor 18 by grounding the mast 16 to meter 14.

Turning now to FIGS. 5 and 6, a different configuration of a pivot adaptor 100 is illustrated. In this embodiment, pivot adaptor generally comprises a mast-side conduit 102, a meter-side conduit 104, a hinge 106, and a releasable lock 108.

Mast-side conduit 102 presents a mast connector end 110 and a first joint end 112, and defines a first cable-receiving channel 114 extending axially through mast-side conduit 102 between mast connector end 110 and first joint end 112. Mast connector end 110 includes a mast connector means for coupling mast-side conduit 102 to the service mast. The mast connector means preferably comprises an internally threaded portion 116.

Meter-side conduit 104 presents a meter connector end 118 and a second joint end 120, and defines a second cable-receiving channel 122 extending axially through meter-side conduit 104 between meter connector end 118 and second joint end 120. Meter connector end 118 includes a meter connector means for coupling meter-side conduit 104 to a socket 124 of an electrical meter 126. The meter connector means preferably comprises an externally threaded portion 128. Mast-side and meter-side conduits 102, 104 are preferably composed of a relatively strong, rigid material such as, for example, steel.

Hinge 106 couples mast-side conduit 102 and meter-side conduit 104 to one another on a hinge side 130 of pivot adaptor 100. Hinge 106 provides for pivotal movement of conduits 102, 104 relative to one another when the pivot adaptor is in the unlocked (i.e., yielded) position (shown in FIG. 6). Hinge 106 generally includes a plurality of mast-side support members 132 coupled to mast-side conduit 102, a plurality of meter-side support members 134 coupled to meter-side conduit 104, and a pin 136 extending through at least a portion of the members 132, 134 and pivotally coupling the members 132, 134 to one another.

Lock 108 couples mast-side conduit 102 and meter-side conduit 104 to one another on a lock side 138 of pivot adaptor 100 when pivot adaptor 100 is in a locked (i.e., normal) position (as shown in FIG. 5). When in the locked position, first and second joint ends 112, 120 preferably contact one another. Lock 108 is preferably a friction-type lock which is releasable without damaging lock 108 when a sufficient force is applied to one of the conduits 102, 104.

Lock side 138 and hinge side 130 are preferably located on generally opposite sides of pivot adaptor 100. Lock 108 generally comprises at least one mast-side lock member 140 coupled to mast-side conduit 102, at least one meter-side lock member 142 coupled to meter-side conduit 104, and a clamp 144 for frictionally coupling members 140 and 142 to one another when pivot adaptor 100 is in the locked position. Preferably, mast-side and meter-side lock members 140, 142 each define corresponding open slots 146, 148 having open ends facing one another. Alternatively, only one of the lock members 140, 142 can present an open slot with the other of the lock members 140, 142 defining a closed hole. Clamp 144 preferably comprises a bolt 150 and a nut 152 which can be tightened to frictionally lock members 140, 142 to one another. Bolt 150 is preferably received in both open slots 146 and 148 when pivot adaptor is in the locked position. When pivot adaptor 100 is in the locked position, bolt 150 is removed from at least one of the open slots 146, 148, thereby allowing conduits 102 and 104 to pivot freely relative to one another via hinge 106.

First cable-receiving channel 114 extends through mast-side conduit 102 generally along a mast-side axis 154. Second cable-receiving channel 122 extends through meter-side conduit 104 generally along meter-side axis 156. When pivot adaptor 100 is in the locked (i.e., normal) position, mast-side axis 154 and meter-side axis 156 are at least substantially aligned. When pivot adaptor 100 is in the unlocked (i.e., yielded) position, mast-side axis 154 and meter-side axis 156 are misaligned. A joint plane 158 intersects pivot adaptor 100 at the joint where first joint end 112 and second joint end 120 meet when pivot adaptor is in the locked position. Joint plane 158 is defined by the plane along which first and second joint ends contact one another when pivot adaptor 100 is in the locked position. A joint angle 160 is defined as the acute angle between joint plane 158 and meter-side axis 158 measured along a plane on which mast-side axis 154 travels when mast-side conduit 102 is pivoted relative to meter-side conduit 104. Joint angle 160 is preferably less than about 90 degrees, more preferably less than about 60 degrees, and most preferable less than 45 degrees. The value of joint angle 160 is important because a smaller joint angle provides for a larger opening for electrical cables to pass through when pivot adaptor is in the unlocked (i.e., yielded) position. These larger openings allow for less severe bending of, and thus less risk of damage to, the electrical cables extending through conduits 102 and 104 when conduits 102 and 104 are pivoted relative to one another.

A pivot angle 162 is defined between mast-side axis 154 and meter-side axis 156 and is measured along the plane along which mast-side conduit 102 travels when it is pivoted relative to meter-side conduit. The desired characteristics of pivot angle are the same as those described above with reference to pivot angle 98 in FIGS. 3 and 4.

Figure 7:
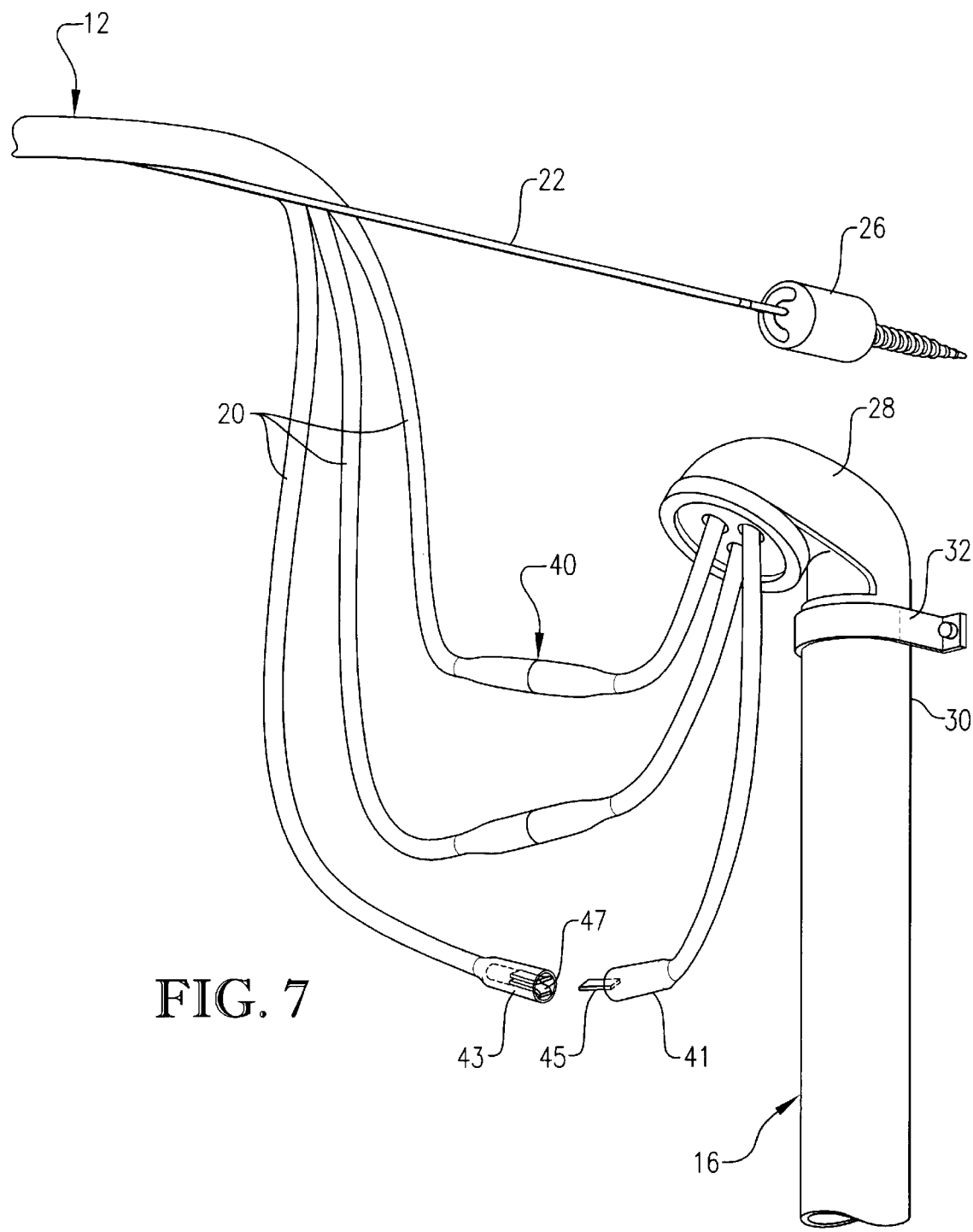
FIG. 7 is a close-up view illustrating in greater detail the releasable electrical connectors coupled to the power line proximal the top end of the service mast.

Referring now to FIG. 7, releasable electrical connectors 40 (initially shown in FIGS. 1 and 2) are illustrated in more detail. Connectors 40 include a male portion 41 and a female portion 43. Male portion includes a conductive projection 45 adapted to be received and clamped between a pair of female conductors 47 recessed in female portion 43. Male and female portions 41, 43 can be physically and electrically decoupled from one another when a sufficient tension force is applied to conductors 20 proximal connectors 40.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An apparatus for associating an overhead powerline with a building, said apparatus comprising:
   a substantially rigid elongated service mast presenting a first mast end and a second mast end and defining a mast channel extending therebetween, said first mast end adapted to be coupled to the fixed structure;
   a substantially rigid junction box adapted to be coupled to the exterior of the building; and
   a pivot adaptor removably coupled to and extending between the second mast end and the box, said adaptor defining an adaptor channel extending therethrough, said adaptor allowing for the mast to swing relative to the box without substantial inelastic deformation of the mast or the box.

2. An apparatus according to claim 1,
   said adaptor allowing for the mast to swing relative to the box without substantial inelastic deformation of the adaptor.

3. An apparatus according to claim 2,
   said box comprising an electrical meter.

4. An apparatus according to claim 3,
   said adaptor comprising a flexible body which bends when the mast swings relative to the box.

5. An apparatus according to claim 4,
   said adaptor comprising a wall support member for keeping the adaptor channel at least substantially open when the mast swings relative to the box,
   said wall support member composed of a material having a greater rigidity than the flexible body.

6. An apparatus according to claim 5,
   said wall support member disposed in the adaptor channel.

7. An apparatus according to claim 6,
   said body having corrugations.

8. An apparatus system according to claim 3,
   said adaptor comprising a mast-side conduit, a meter-side conduit, and a hinge for providing pivotal movement of the conduits relative to one another when the conduits are in a unlocked position.

9. An apparatus according to claim 8,
   said adaptor comprising a friction lock for inhibiting relative pivoting of the conduits when the conduits are in a locked position.

10. An apparatus according to claim 9,
    said conduits comprising a substantially rigid material.

11. An apparatus according to claim 3, and
    a releasable electrical connector positioned proximal the first mast end and adapted to be electrically coupled to the power line, said connector adapted to be at least partly electrically decoupled from the power line when the first mast end becomes decoupled from the building.

12. An apparatus according to claim 3,
    said adaptor being internally pivotable.

13. An apparatus for associating an overhead powerline with a building, said apparatus comprising:
- a substantially rigid elongated service mast presenting a first mast end and a second mast end and defining a mast channel extending therebetween, said first mast end adapted to be coupled to the fixed structure;
- a substantially rigid junction box adapted to be coupled to the exterior of the building; and
- a pivot adaptor coupled to and extending between the second mast end and box, said adaptor defining an adaptor channel extending therethrough, said adaptor being internally pivotable without substantial inelastic deformation of the adaptor.

14. An apparatus according to claim 13,
said adaptor allowing for the mast to swing relative to the box without substantial inelastic deformation of the adaptor, the mast, or the box.

15. An apparatus according to claim 14
said adaptor channel remaining at least substantially open when the mast swings relative to the box.

16. An apparatus according to claim 15,
said box comprising an electrical meter.

17. An apparatus according to claim 16
said adaptor comprising a flexible body which bends when the mast swings relative to the box.

18. An apparatus according to claim 17,
said adaptor comprising a wall support member for keeping the adaptor channel at least substantially open when the mast swings relative to the box,
said wall support member composed of a material having a greater rigidity then the flexible body,
said wall support member disposed in the adaptor channel.

19. An apparatus according to claim 16,
said adaptor comprising a mast-side conduit, a meter-side conduit, and a hinge for providing pivotal movement of the conduits relative to one another when the conduits are in an unlocked position,
said adaptor comprising a friction lock for inhibiting relative pivoting of the conduits when the conduits are in a locked position.

20. A method of associating a substantially rigid exterior service mast with a substantially rigid exterior electrical meter, said method comprising the steps of:
- (a) coupling a first end of a pivot adaptor to the electrical meter;
- (b) coupling a second end of the pivot adaptor to the service mast; and
- (c) passing an electrical cable through a channel of the pivot adaptor, said pivot adaptor providing for movement of the service mast relative to the electrical meter without substantial inelastic deformation of the electrical meter or the service mast.

21. A method according to claim 20,
said pivot adaptor providing for movement of the service mast relative to the electrical meter without substantial inelastic deformation of the adaptor.

22. A method according to claim 20, and
- (d) frictionally coupling a mast-side portion of the pivot adaptor to a meter-side portion of the pivot adaptor.

23. An apparatus according to claim 1,
said pivot adaptor presenting a first adaptor end adjacent the second mast end and a second adaptor end spaced from said first adaptor end and adjacent said box,
said first and second adaptor ends extending along respective first and second adaptor axes,
said first and second adaptor axes defining a pivot angle therebetween,
said pivot angle varying when the mast swings relative to the box.

24. An apparatus according to claim 23,
said pivot angle varying by more than about thirty degrees when the mast swings relative to the box.

25. An apparatus according to claim 23,
said pivot angle varying by more than about sixty degrees when the mast swings relative to the box.

26. An apparatus according to claim 23,
said pivot angle varying by more than about ninety degrees when the mast swings relative to the box.

27. An apparatus according to claim 23,
said pivot angle being greater than about one-hundred thirty-five degrees.

28. An apparatus according to claim 27,
said pivot angle being less than about one-hundred thirty-five degrees once the mast has swung relative to the box.

29. An apparatus according to claim 28,
said pivot angle being less than about ninety degrees once the mast has swung relative to the box.

30. An apparatus according to claim 23,
said first and second adaptor axes extending at least substantially parallel to one another.

31. An apparatus according to claim 30,
said first and second adaptor axes being substantially coaxial.

* * * * *